May 3, 1966  R. J. ST. JEAN  3,249,085
NAUTICAL DATA CORRELATOR
Filed Oct. 29, 1964  2 Sheets-Sheet 1
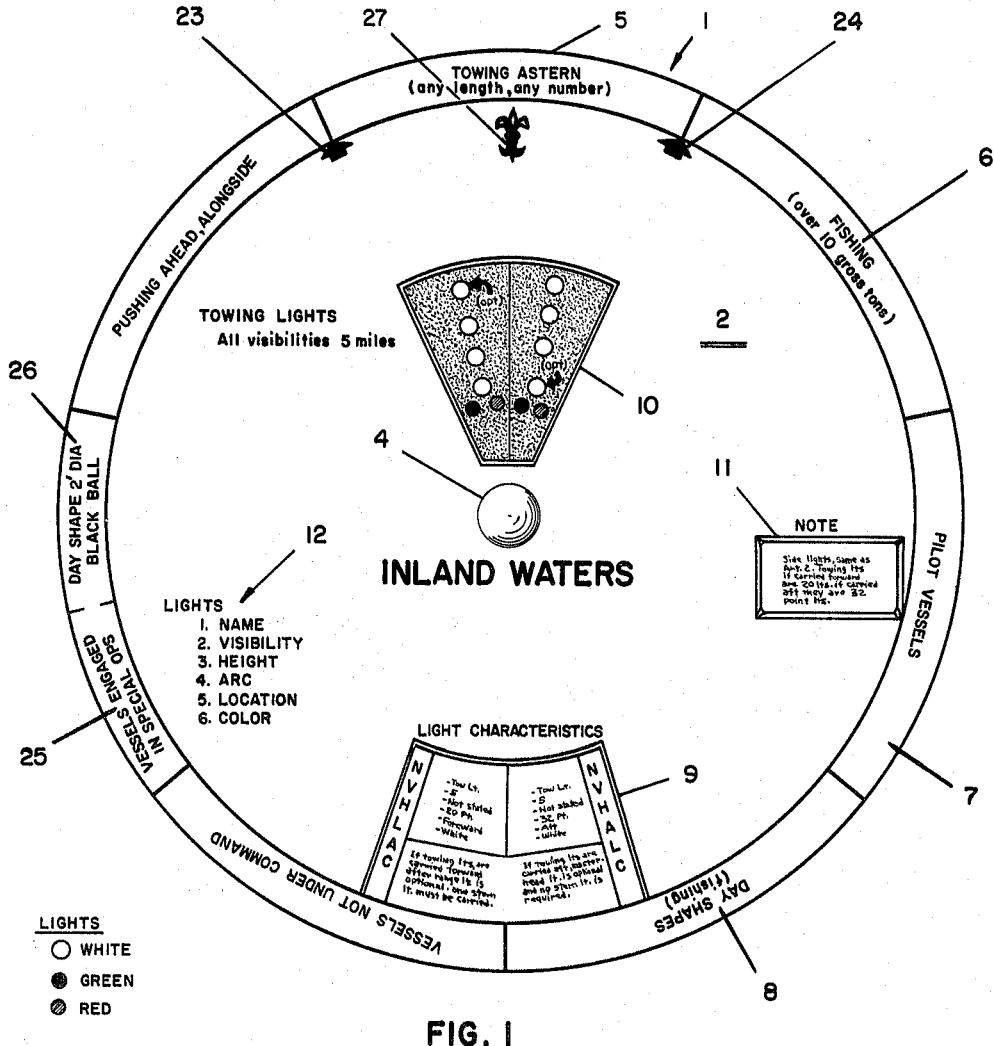
FIG. 1
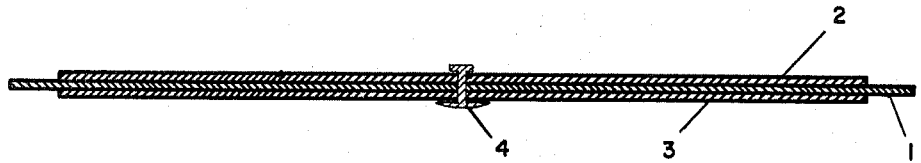
FIG. 2
INVENTOR.
RUSSELL J. ST. JEAN
BY 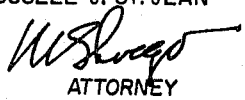
ATTORNEY United States Patent Office 3,249,085
Patented May 3, 1966

3,249,085
NAUTICAL DATA CORRELATOR
Russell J. St. Jean, 14 Ash St., Portsmouth, R.I.
Filed Oct. 29, 1964, Ser. No. 407,591
6 Claims. (Cl. 116—133)

The invention described herein may be manufactured and used by or for the Government of the United States of America for governmental purposes without the payment of any royalties thereon or therefor.

The present invention relates generally to a data correlating device for nautical information and, more particularly, to a disk-type indicator for readily illustrating the lighting requirements and other identification markings for various types of vessels operating in inland and international waters.

Vessels navigating the high seas and inland waters are required by Coast Guard regulations to show specified lights and/or day shapes, depending upon the conditions under which they are proceeding or operating. These rules, designed to prevent collisions, are listed in a Coast Guard publication, and all persons navigating or piloting public or private vessels must be familiar with them.

In the past, card sets and photographic presentations have been used to familiarize Navy personnel with these Coast Guard regulations. However, these aids, while helpful, do not provide a quick, ready reference since the individual must examine a multiplicity of separate displays in order to identify the correct one.

The present invention is directed to a disk-type indicator or training aid of lightweight construction and compact design that can be readily set to indicate the lighting conditions or other identification markings or symbols required by vessels engaged in such activities as, for example, towing, fishing, piloting on inland or international waters. With the indicator of the present invention, the user can readily scan all of the international or inland lighting conditions, for example, to ascertain the nature of the situation confronting him or, conversely, the lighting arrangement needed to mark a particular operational procedure.

The present indicator, which is of a simple and rugged construction, in one series of settings graphically depicts the appropriate lighting arrangement and additionally lists in tabular form the physical characteristics of these lights, that is, for example, their visibility, height, arc, location and color. More particularly, the indicator includes a base disk having preselected nautical data recorded on both faces thereof. On one face this data relates to the displays for international waters; on the other, for inland waters. Cooperating with each face of this base disk is a rotatable scanning disk of decreased diameter which has viewing windows cut therein. Each disk has selector marks printed on a perimeter portion and when these marks are set to a particular vessel situation printed on the uncovered marginal area of the base disk, the operator can view through one of the windows a graphic illustration of the proper lighting or marking arrangement required by the Coast Guard regulations and through another window he can read the specified characteristics of these lights or symbols. In certain other instances, additional pertinent information can be read through a third window. Thus, by selecting the appropriate side of the indicator, the operator can in a minimum time identify the lighting configuration required by the Coast Guard rules to cover a particular operating procedure or, alternatively, discover the operating status of an illuminated vessel by examining the window as the scanning disk is rotated through a complete cycle.

It is accordingly a primary object of the present invention to provide a data correlating device for use in nautical applications.

Another object of the present invention is to provide a data correlating device which can be used as a quick reference to indicate the various types of markings and lighting arrangements required by vessels operating in international or inland waters.

A further object of the present invention is to provide a training aid for instructing personnel in the Coast Guard rules covering the various displays required by vessels operating in international or inland waters.

Other objects, advantages and novel features of the invention will become apparent from the following detailed description of the invention when considered in conjunction with the accompanying drawings wherein:

FIG. 1 is a face view of one side of the indicator of the present invention;

FIG. 2 is a section taken along one diameter of the base disk 1; and

Figure 3:
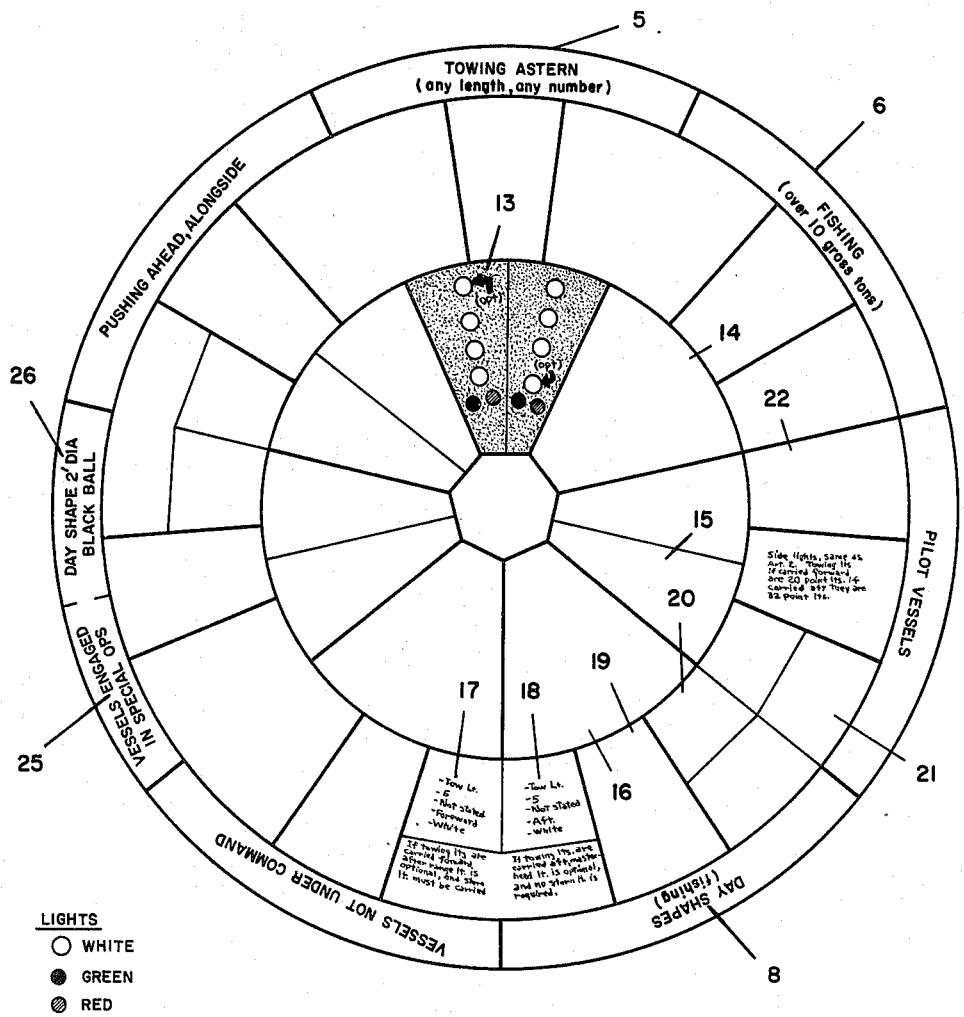
FIG. 3 illustrates the general arrangement of the data on the inland side of base disk 1.

Referring now to the drawings and, more particularly, to FIG. 2, it will be seen that the present invention, in one preferred embodiment, takes the form of three circular disks, 1, 2, and 3, secured together in a concentric relationship by means of a rivet 4 so that they may be rotated one with respect to the others. Central disk 1, which may be considered the base element of the indicator, is of the greatest diameter, and its outer exposed perimeter portion, as perhaps best seen in FIGS. 1 and 3, is subdivided in the present embodiment into seven major arcuated spaces, such as 5, 6, 7, 8, etc., which bear descriptive phrases identifying various nautical conditions or procedures. Typical of the procedures listed on the side of disk 1 designed for use in inland waters are "towing astern," "fishing vessels over ten gross ton," "pilot vessels," "day shapes for fishing," "vessels not under command," "vessels engaged in special operations" and "vessels pushing ahead or alongside other vessels."

Disk 2, one of the scanning disks, is provided with three windows, an outer open-ended sector window 9, an inner pie-shaped window 10 vertically aligned therewith, and a horizontally orientated, rectangular window 11, the latter being located approximately midway between the other two windows. It will be appreciated that windows 9 and 10 are arranged so they expose to view complementary outer and inner ring portions of base disk 1 when disk 2 is rotated throughout a complete 360° cycle. Window 11, because of its location, views the same outer ring unit window 9 does.

Each of the scanning disks is of similar construction and appearance except for the nature of some of the data printed thereon. For example, disk 2 has the legend "inland water" printed in bold type in a horizontal line immediately below the center of the disk, while disk 3 has the legend "international waters" printed at this location. Also, each disk has a legend "12" printed thereon listing in a vertical column under the title "lights" the following words:

(1) Name
(2) Visibility
(3) Height
(4) Arc
(5) Location
(6) Color

Printed over the inner edge of window 9 is the legend "LIGHT CHARACTERISTICS" indicating that this window, as noted above, may be referred to to ascertain the physical characteristics of the lighting arrangements required by the appropriate regulations. Also, the radial edges of this window are marked with the letters, "N, V, H, A, L, C," which letters, it will be appreciated, correspond to the first letters in the six words listed under "lights."

Disk 1, the base disk, as perhaps best seen in FIG. 3, has essentially three rings of data printed thereon, an outer ring made up of major sectors 5, 6, 7, 8, etc., designating the operating conditions or procedures of interest; an inner ring made up of a similar number of sectors, such as 13, 14, 15, 16, etc., aligned with the aforemention sectors and printed with graphic illustrations depicting the lighting arrangements or marking symbols required for the corresponding vessel conditions or procedures mentioned in the outer ring; and an intermediate ring made up of a multiplicity of sectors, 17, 18, 19, 20, 21, etc., printed in some instances with vertical columns of information related to and aligned with the six terms listed in legend "12."

Window 9 has an aperture which is less than the area between the outer arcuated edges of window 10 and the confronting rim portion of disk 2 which is bounded by selector marks 23, 24 and, consequently, the various sectors required in the intermediate ring to display the lighting or symbol characteristics through this window do not occupy all the space available in this ring. Consequently, a portion of this ring can be utilized to display other pertinent nautical information, and this data can be read through window 11. In the present embodiment, there is printed over the top horizontal edge of this window the word "NOTE" and, by referring to this space, the user of the indicator can, in certain instances, find out additional information relevant to the situation being investigated.

The operation of the present invention is relatively simple. To use the device, the operator need only ascertain whether the problem arises in connection with inland or international waters, turn the device to that side, and then merely align selector markers 23 and 24 printed on the perimeter of the scanning disk to the particular operating condition being investigated. When this is done, window 10 will reveal in pictorial form a display of the required lighting arrangement. In the case shown in FIG. 1, the selector marks are set to "TOWING ASTERN" and the graphic illustration exposed to view through this window indicates that when in inland waters the vessel should carry three white vertical lights in alignment and, optionally, a fourth light above or below these lights, as well as its port and starboard running lights. Because of the alternative arrangements permitted in this case, sector 13 is subdivided with a pictorial representation printed in each half thereof. It would be noted that the running lights may be appropriately colored so that the viewer can readily distinguish these lights from those required by the operational procedure.

If window 9 is now referred to, the physical characteristics of the towing lights can be directly determined by relating each line of information printed therein to the six letters printed along the radial edges. In the case described above, the information opposite each of the above letters is "Tow Lights," indicating the names of the lights in question; "5," their visibility in miles; "Not stated," showing that the Coast Guard regulation is silent as to their height; "20 Points" or "32 Points," indicating their arc; "Forward" of "Aft," their alternative locations; and "White," their color.

Because window 9 is less than full size, as mentioned above, the intermediate data ring can also be used to provide additional information to the user of the device. Thus, window 11 can now be examined to see whether any other information is displayed therein. It will be appreciated that in order to have additional information available for each of the seven conditions marked around the rim of disk 1, the size of window 9 must be appropriately reduced. For example, if window 9 has an angular opening which is approximately two-thirds of that subtended by the radial lines defining the opposite edges of window 10, there will be approximately seven areas in the intermediate ring one-third the size of window 9 which can be used to present information for the "NOTE" area of window 11.

As mentioned hereinbefore, the inner most ring can be subdivided, such as in the case shown in FIG. 1, to illustrate alternative lighting conditions or, for example, in the case of certain vessels, those under sail or operating under steam. Where such is the case, of course, the corresponding area under window 9 can likewise contain two vertical columns for listing information for each of these alternative conditions of propulsion. It is for this reason that the opposite radial edges of this window have code letters printed therealong.

Besides displaying the various lighting arrangements, disk 1, its innermost ring can be printed with day shapes, such as, for example, the baskets used to identify fishing operations. Likewise, if the designated condition, procedure or situation is covered by a multiplicity of different regulations, then instead of showing these arrangements, the sector can merely list these sections of the Coast Guard publication. For example, in the case of vessels engaged in special operations, window 11 is blank and sector 22 states that these vessels must indicate their condition by special lights and shapes which may be found in the Pilot Rules, Sections 80.18 through 80.22. Consequently, the individual using the chart is directed to the proper sections of the regulations for complete and detailed information.

It would be noted in connection with disk 1 that certain of the major sectors which constitute the outer ring may be further subdivided, such as at 25 and 26, to designate two different, unrelated conditions or procedures. For example, in the present case, these subsectors cover "vessels engaged in special operations" and "day shape, two-foot diameter black ball."

When the outer ring contains subsectors, the corresponding inner ring sector, as mentioned above, is subdivided to give information on each of these two situations, and the same is true with respect to the columns of information printed in the intermediate ring. To improve the ease at which information within window 10 can be correlated to the two different titles in the outer subsectors, an additional selector mark 27 is printed at the periphery of each scanning disk at a point midway between the other selector disks 23 and 24. Thus, marks 23 and 27, for example, can be used to select one of the subsectors printed on the rim of base disk 1.

It would be pointed out that not only can the light characteristics be printed in the various sectors making up the intermediate ring but also any other desirable information relating to these lights can be set forth. For example, in the case of towing astern in inland waters, the following notation appears below the six identification lines: "If towing lights are carried forward, after mast light is optional and stern light must be carried. If towing lights are carried aft, mast head light is optional and no stern light is required." Since, as mentioned above, there are optional lighting arrangements in the case of towing astern, window 11 under "Note" states that the side lights are the same as Article 2 and that towing lights if carried forward are 20 point lights; if carried aft, 32 point lights. Thus, there is some explanation for the alternative lighting arrangements presented in window 9.

The other side of base disk 1, it will be appreciated, is printed with data relevant to the operation of vessels in international waters. Here, again, the face of the disk can be subdivided into three data rings. However, the number of subdivisions in each of these rings need not be the same as on the other face of disk 1. If these subdivisions are of decreased size, then, of course, more than one lighting arrangement will be visible through the pie-shaped inner window of disk 3. However, key information can be printed in these sectors to identify the appropriate situation. In one particular embodiment of the invention, the outer ring was printed with the following conditions or procedures: "FISHING," "PILOT VESSELS," "DAY SHAPES FOR FISHING VESSELS," "VESSELS NOT UNDER COMMAND," "VESSELS ENGAGED IN UNDERWATER OPERATIONS," "DAY SHAPE 2′ DIAMETER BLACK BALL," "PUSHING AHEAD— ALONGSIDE ONE TOW—2 TOWS— 600′ ASTERN," and "TOWING ASTERN TWO VESSELS LENGTH OF TOW EXCEEDS 600′." In the case of the inner sector devoted to fishing, the area exposed through the pie-shaped window on disk 3, corresponding to window 10 of disk 2, was subdivided into three equal subsectors covering "Trawling," "less than 500 feet" and "greater than 500 feet."

It will be appreciated that the specific data printed on each of the sides of disk 1 depends upon the conditions or procedures most frequently encountered, and those listed above merely represent one group that can be used to advantage in the indoctrination and instruction of Naval personnel.

Obviously many modifications and variations of the present invention are possible in the light of the above teachings. It is therefore to be understood that within the scope of the appended claims the invention may be practiced otherwise than as specifically described.

What is claimed is:

1. A data correlating device for familiarizing personnel with the identification requirements of nautical vessels comprising, in combination:
   a circular base disk;
   a circular scanning disk of decreased diameter concentrically mounted on each side of said base disk and capable of rotation with respect to said base disk;
   said base disk having an exposed rim portion subdivided into a plurality of arcuated sectors,
      each of said sectors having printed therein descriptive phrases identifying various nautical conditions or procedures;
   each of said scanning disks having a first and second sector-shaped window cut therefrom,
      said windows being symmetrically positioned with respect to a diameter of said scanning disk and being located in different halves of said scanning disk,
      said first and second windows exposing to view complementary inner and outer ring portions, respectively, of said base disk when each scanning disk is rotated through one complete 360° cycle with respect to said base disk,
      said inner and outer ring portions of said base disk being subdivided into a number of sectors related to the number of said arcuated sectors,
   selected sectors of said inner ring having pictorial illustrations printed therein depicting the identification arrangement for the condition or procedure printed in the arcuated sector, radially spaced therefrom,
   and selected sectors of said outer ring having information printed therein describing the characteristics of the pictorial information printed in the corresponding sector of said inner ring that is diametrically spaced therefrom.

2. In an arrangement as defined in claim 1,
   a pair of selector marks printed at a rim portion of each scanning disk,
      said selector marks being spaced apart a distance equal to the length of each arcuated sector.

3. In an arrangement as defined in claim 1,
   a rectangular window cut in each scanning disk,
      said rectangular window exposing to view said outer ring of said base disk when said scanning disk is rotated through a complete 360° cycle with respect to said base disk,
      and selected sectors of said outer ring having pertinent explanatory information printed therein related to the condition or procedure printed in one of said arcuated sectors.

4. In an arrangement as defined in claim 3 wherein
   said outer window has an angular aperture which is less than the width of said arcuated sectors whereby the sectors of said outer ring required to contain information descriptive of the physical characteristics of the pictorial information printed in the sectors of the inner ring do not take up the complete outer ring, whereby a portion of this outer ring can be printed with said pertinent explanatory information.

5. In an arrangement as defined in claim 1,
   wherein the information printed in said selected sectors of said outer ring is arranged in columns,
   and wherein a legend explaining the meaning of said information is printed on the face of each scanning disk.

6. In an arrangement as defined in claim 5,
   wherein a series of indexing letters is printed along the radial edges of said second window to correlate said information printed in said columns with said legend, thereby to simplify its interpretation.

No references cited.

LOUIS J. CAPOZI, *Primary Examiner.*